J. W. BATSON.
Harvester Cutter.
No. 15,409.
Patented July 29, 1856.
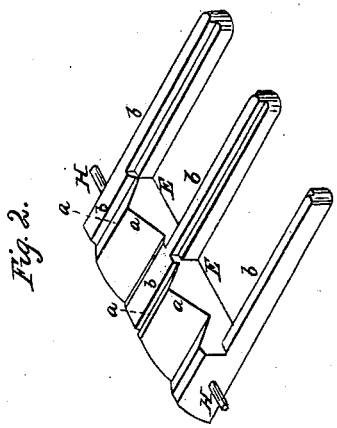
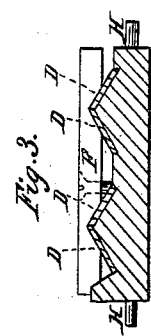
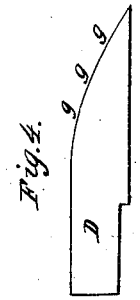
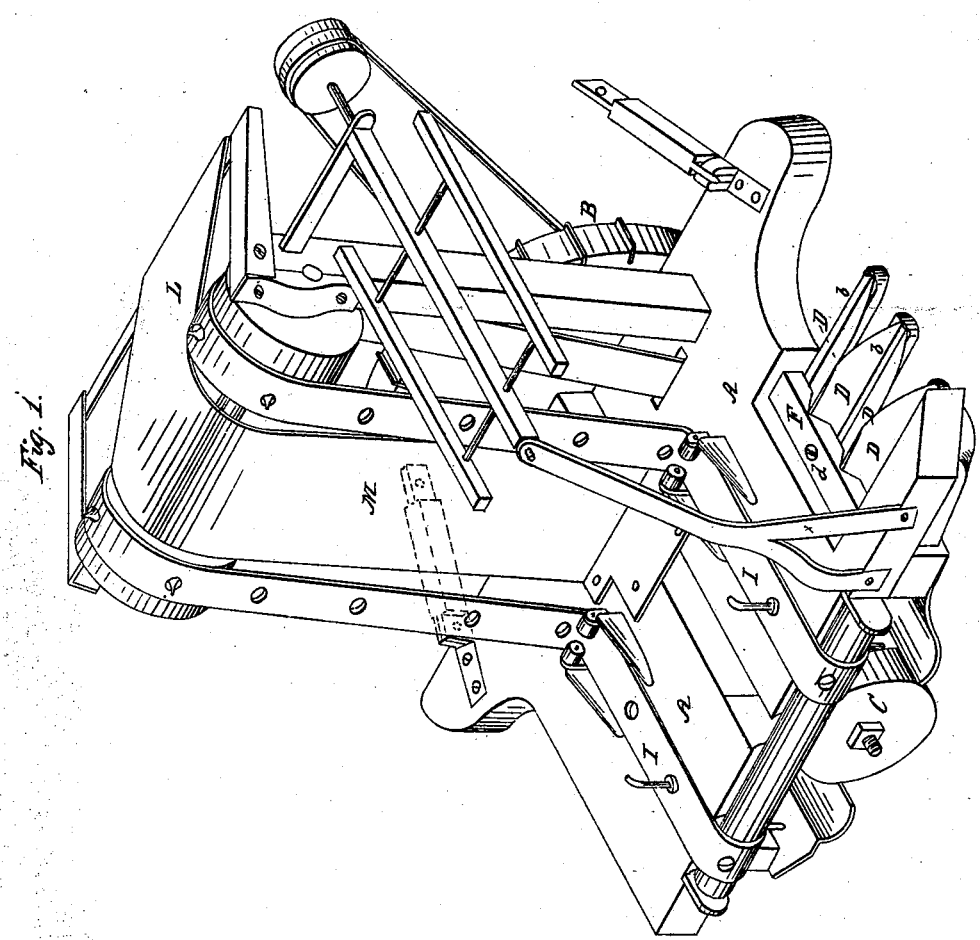

UNITED STATES PATENT OFFICE.

JOHN W. BATSON, OF TRIADELPHIA, MARYLAND, ASSIGNOR TO HIMSELF AND M. H. BATSON.

IMPROVEMENT IN THE CUTTING APPARATUS OF CORN AND CANE HARVESTERS.

Specification forming part of Letters Patent No. 15,409, dated July 29, 1856.

*To all whom it may concern:*

Be it known that I, JOHN W. BATSON, of Triadelphia, in the county of Montgomery and State of Maryland, have invented certain new and useful Improvements in the Cutting Apparatus of Corn or Cane Harvesters; and I do hereby declare the following to be a full, clear, and exact description thereof, reference being had to the accompanying drawings, in which—

Figure 1 represents a perspective view of the machine entire. Fig. 2 represents the frame of the cutting apparatus in a perspective view. Fig. 3 represents a vertical cross-section through the cutting apparatus. Fig. 4 represents the shape of one of the knives used on the cutting apparatus.

To enable others skilled in the art to make and use my invention, I will proceed to describe the same with reference to the drawings.

A represents the platform of the harvester, to which the journal-boxes of the driving-shaft are affixed, which bears at one end the driving-wheel B and at the other end the supporting-pulley C.

The apparatus is provided in front with a cutting apparatus of the following description: The cutting apparatus consists of knives D, the shape of which is represented at Fig. 4, which are set onto a frame, E, Fig. 2, in an oblique position toward each other, so that the cutting-edges of each two knives are lines which are oblique in two directions for the purpose hereinafter described. The iron frame or support E is provided with inclined planes *a*. The knives D are laid onto this, and are held there in their places by means of projections *b*, adapted to the size and shape of said knives. When arranged properly in this manner the iron bar F, Fig. 3, provided at its lower side with recesses corresponding to the V-shaped cutters, is placed on the top and secured there by means of a screw, *d*, or otherwise. When the apparatus advances toward the stalks to be cut the knives are kept stationary and not moved, as in other harvesting-machines; but as the oblique edge *g* of the knife D is set in an oblique position, as shown in Fig. 3, it will cut the stalks from below upward in an oblique cut, and, as it is a well-known principle that all tools with smooth cutting-edges will work to their best advantage when the edge operates in an oblique or double cut, I have built this cutting apparatus on said principle, for in the first moment the point of the knife D operates on the stalks, and as the cutting-edge rises the cut will be an oblique one, and if some stalks are not cut by the action of one single knife they are sure to be cut at the point where the edges of two knives meet. This cutting apparatus, besides affording great facilities in cutting, is not liable to to be clogged up, like those which are provided with movable cutters. It can be mounted in a most substantial manner, and is not liable to get out of order. The frame or under supporter, E, is pivoted into the frame A by means of the pivots H, which afford the means to raise the cutters into a vertical position when the machine is not to be worked, and thus to prevent the knives from catching against the previously-cut corn or cane when the machine is drawn through the stubble. The stalks, when cut, are thrown onto the platform A, where they fall onto the rake-belts I, which convey them upward on the shield M, and when arrived at the top they slide down the inclined plane L into a wagon, which is fastened alongside the harvester to receive the cut grain.

Having thus fully described the nature of my invention, what I claim therein as new, and desire to secure by Letters Patent, is—

1. The double-angled V-shaped cutters composed of strips and under supports, substantially as represented, and for the purposes set forth.

2. Hanging said cutters to a pivoted bar, so that they may be raised up out of cutting position when the machine is drawn through the stubble to prevent their catching against the previously-cut corn or cane, as set forth.

JOHN W. BATSON.

Witnesses:
A. B. STOUGHTON,
E. COHEN.